Sept. 4, 1962    G. MARULLO ETAL    3,052,724
PROCESS FOR PREPARING CARBONYL COMPOUNDS FROM OLEFINES
Filed Oct. 24, 1958
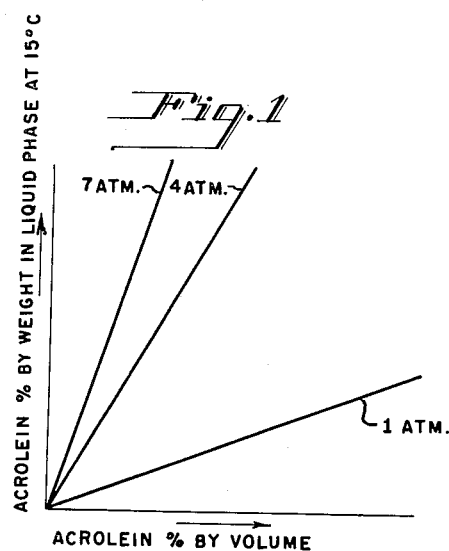
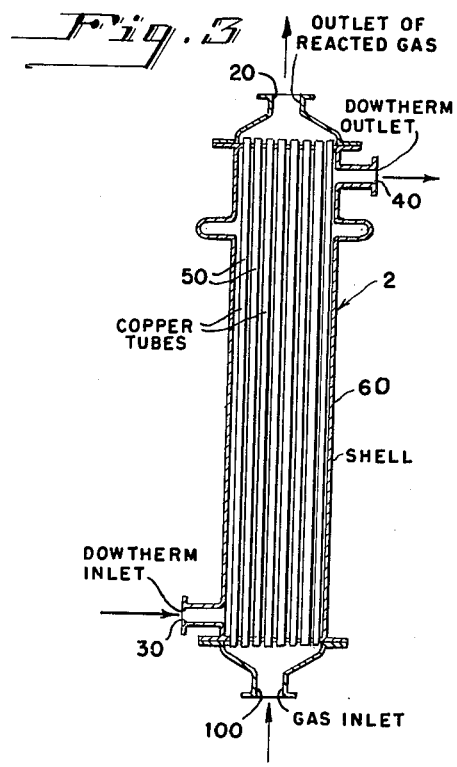
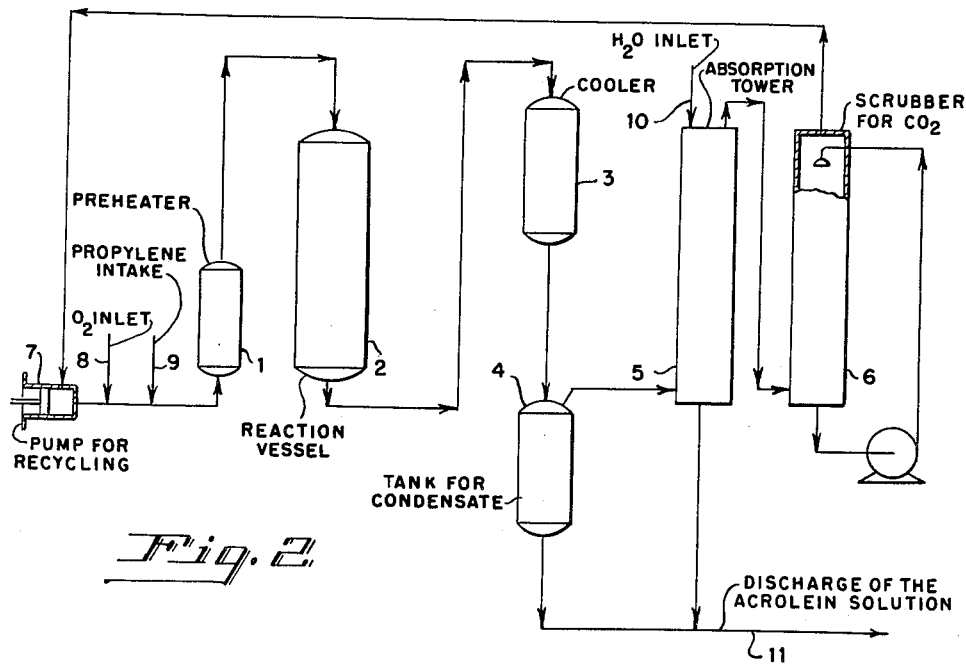

3,052,724
PROCESS FOR PREPARING CARBONYL
COMPOUNDS FROM OLEFINES
Gerlando Marullo and Marco Agamennone, Novara, and Luigi Corsi, Milan, Italy, assignors to Montecatini Società Generale per l'Industria Mineraria e Chimica, Milan, Italy, a corporation of Italy
Filed Oct. 24, 1958, Ser. No. 769,382
Claims priority, application Italy Oct. 31, 1957
7 Claims. (Cl. 260—604)

The present invention relates to improvements in processes for preparing unsaturated carbonyl compounds containing from three to six carbon atoms. It relates particularly to the preparation of acrolein from propylene, and of methacrolein from isobutene, by catalytic oxidation with molecular oxygen.

It is known that various aldehydes can be obtained by oxidizing low molecular weight olefines, such as propylene or butene, with air or oxygen, in the presence of moderate oxidation catalysts such as copper, silver and aluminum, employed in the metallic state or supported on carriers. For example, formaldehyde, acetaldehyde, acrylaldehyde, and benzaldehyde can thus be obtained. It is also known that this reaction can be directed, by varying the oxidation conditions, so as to give more highly oxidized products, such as carboxylic acids, and finally carbon dioxide and water, if the oxidation conditions are not sufficiently controlled. The control of the reaction can be facilitated by diluting the gases with inert substances.

The technique for oxidizing olefines has been subsequently developed to obtain, as main products, unsaturated carbonyl compounds with high yields, by employing as catalyst a supported copper derivative, such as cuprous oxide.

According to U.S. Patent 2,451,485, which relates mainly to production of acrolein from propylene and other unsaturated compounds, the reaction is preferably carried out in the presence of gaseous diluents, such as steam and nitrogen, in order to control the reaction and to obtain high yields. As appears from the various examples of the aforementioned patent, the percentage of diluent varies from 43 to 70% of the mixture fed to the catalytic converter. The said converter comprises one or more tubes of small diameter containing the catalyst. By operating in this way, the heat of the highly exothermal reaction is transported from the catalyst granules to the reactor walls, from which it is removed by the reaction gases, which obviously undergo an overheating. This fact makes it necessary to use diluents, and small-diameter tubes and to maintain a low specific productivity in order to contain the heat development. However, according to this method, even by operating in small-diameter tubes, it is impossible to eliminate the diluent, and to operate under high oxygen partial pressures, without causing a very marked lowering in the yields and in the productivity.

This is confirmed by some comparative runs carried out by the applicants, in which the operative conditions described in the afore-mentioned patent were strictly observed.

For the same reason, by operating as described above, the oxidation cannot be effected under pressure above atmospheric, unless the pressure effect is balanced by a corresponding dilution of the reaction gases.

The applicants have studied, in particular, the use of metallic copper as an oxidation catalyst, and have found that, in the case of propylene, acrolein is the main product among the aldehydes obtained when the oxidation conditions are suitably regulated. Although the catalyst metallic copper, employed in various forms, has a remarkably high thermal conductivity and therefore facilitates the elimination or passage of the reaction heat toward the reactor walls, the problem relating to transfer of the reaction heat is not completely solved. This is so because the diluent cannot be eliminated, and, above all, high partial pressures of propylene and oxygen cannot be employed.

An object of the present invention is the problem of eliminating the reaction heat, with a perfect isothermal catalysis, resulting in high yields and high productivity of acrolein and methacrolein, such as those obtained by operating in absence of diluent and under a pressure above atmospheric.

The process according to the present invention is essentially characterized in that the oxidation with molecular oxygen of olefines containing from three to six carbon atoms, in particular propylene and isobutene, is carried out in a pressure apparatus consisting of a copper tube having the shape of a coil or of a copper heat exchanger of the Linde or of a similar type, immersed in a therostatic fluid, such as boiling Dowtherm, so that the reaction heat developed on the inner copper surface in contact with the reaction gases is instantaneously removed. As is well known, Dowtherm is a eutectic mixture of phenyl ether and 26.5% diphenyl, which melts at 12° C. and boils at 258° C. The apparatus substantially fulfills the requirement of having available the greatest surface for the heat exchange as compared with the available volume of the reactor. The olefine-oxygen mixture is rapidly passed inside the apparatus and the copper surface catalyzes the reaction.

Although, as mentioned above, the oxidation can be carried out in any type of apparatus which takes advantage of the principle of the present invention, most of our runs have been carried out in a copper tube having an inner diameter of 3 mm., immersed in boiling Dowtherm.

In an equally advantageous way, we can use an apparatus consisting for example of a series of copper sheets with parallel, adjacent walls, in which the thermostatic fluid and the reaction gases are alternatively circulated.

In these types of apparatus it is advantageous, with regard to the yields, to employ the greatest possible surface in relation to the volume available for the reacting gases, in order to reduce undesired reactions, involving total combustion.

In the case of propylene, using the afore-mentioned copper tube having an inside diameter of about 3 mm. we can operate, for instance, without any diluent, with a gas consisting of 80% propylene and 20% oxygen under a pressure of 4 to 8 atm., thus obtaining total aldehyde molar yields of 70–85%, calculated on the basis of the transformed propylene, and acrolein yields of 60–75%.

The aldehydes obtained as side products in case the catalysis is carried out under normal pressure with supported catalysts, are formaldehydes, acetaldehyde, and propionaldehyde. A ketone is also obtained, that is, acetone.

Our described improvement in processes for oxidizing olefine hydrocarbons to carbonyl products has the following main advantages:

(a) The elimination of the diluent. It no longer has a function or purpose, because it is not necessary to moderate the reaction or make use of a gaseous mass which can absorb a portion of the developed heat. This function is suitably carried out by the copper surface which catalyses the reaction and quickly eliminates the heat developed.

Since, according to the prior art, the diluent was employed in amounts corresponding to 40 to 70% of the reacting gas, the diluent being a gas such as nitrogen or carbon dioxide which cannot be condensed at room temperature, or being a condensable vapor, such as steam, the advantages deriving from this elimination are evident. They include higher unit productivity and lower volumes of circulating gases and, therefore, lower initial installation and operating costs.

(b) The possibility of operating under superatmospheric pressure, with high oxygene and olefine partial pressures, and in absence of diluent. This makes it possible, the other factors, such as contact time and olefine/oxygen ratio, being the same, to obtain unit productivities markedly higher than those of the prior art, as can be easily seen from the examples below.

Moreover, this process makes it possible to employ auxiliary equipment of considerably reduced size without the need for using especially resistant materials due to the low pressure. This obviously causes remarkable reductions in the installation and operative costs. Such auxiliary equipment includes the absorption tower, cooler, tower for removing carbon dioxide produced, connecting pipes, etc.

(c) Easy recovery of acrolein from the reaction gases, since the recovery can be carried out under the same pressure as that of the catalysis. It is known that one of the most practical systems for recovering the carbonyl products from the reaction gases, such as in the case of propylene oxidation, consists of scrubbing with water, in which acrolein is quite soluble, and recovering the reaction products by distilling the aqueous solutions. Due to the low acrolein content of the gases, aqueous solutions of low concentration are obtained by scrubbing at atmospheric pressure, and therefore large volumes of water are required for the scrubbing operation. This is illustrated by the accompanying diagram (FIG. 1) showing the vapor pressure curve of an aqueous acrolein solution. In the diagram the acrolein percentages by volume in the gas are reported on the abscissae and the acrolein percentages by weight in the liquid phase are reported on the ordinates, at a temperature of 15° C. and under various pressures (in the diagram at 1, 4, 7 atmospheres). The acrolein content in the gas is the same. Markedly more concentrated aqueous solutions are obtained by scrubbing under pressure, with a resulting saving in plant and operative costs, in respect to the scrubbing and recovery stages.

The same saving can be obtained in processes in which, in order to obtain more concentrated aqueous solutions, the gases coming from the synthesis under atmospheric pressure are first compressed and then, after the recovery of acrolein, are expanded for recycling to the reactor.

An obvious and similar advantage is obtained in the processes for recovering carbonyl compounds from gases in which liquid olefine is used as solvent and the gases coming from the catalytic reaction are compressed under 7 to 30 atm.

(d) The elimination of the use of supported catalysts of the type described in U.S. Patent 2,451,485. It is evident that this makes possible the further reduction of the cost of the process, since the apparatus itself has a catalytic function.

In order that the oxidation may take place with high yields, high productivity and a high proportion of the desired unsaturated carbonyl products, in comparison with the above-mentioned saturated aldehydes, it is necessary that the various parameters which regulate the oxidation be suitably controlled. While some experimental values of these parameters are reported in some of the specific examples below, such factors can be varied within limits, as follows:

The oxidation under pressure on a copper surface can vary within a very wide temperature range, i.e., from 200° to 600° C., preferably from 250 to 550° C., since this parameter is clearly influenced by the other factors which regulate the oxidation, such as contact time, oxygen and olefine partial pressures, the presence of diluents, if any, introduced deliberately or forcibly with the reactants used, and the type of olefine employed.

Equally wide is the range over which the ratio between the olefine partial pressure and the oxygen partial pressure can vary. In general all the ratios comprised between 2 and 15 can be employed. In practice, however, it is not convenient to use very low ratios, in order not to reach the limits of explosivity of the olefine-oxygen mixture, while it is not advisable to use very high ratios which would cause an unjustified decrease of productivity and a burdensome dilution of the carbonyl products obtained.

The oxidation in the presence or absence of diluents or in the presence of catalyzing metallic surfaces, in the previously illustrated meaning, can be suitably carried out under 1 to 40 atm., preferably under 1 to 25 atm., the upper limit being dependent on the cost of the apparatus and on the nature of the olefine used. In fact, as the olefines used in these oxidations have, at room temperature, a vapor pressure below 10 atm., the condensation of the hydrocarbons takes place whenever the olefine partial pressure exceeds the vapor pressure of the same olefine at room temperature. If one desires to operate under pressure much higher than 8 atm., one should use a more complicated apparatus in order to avoid such a condensation. On the other hand, in the case of propylene under total pressures of 4 to 6 atm., high productivity, high yields and high acrolein concentrations in the aqueous scrubbing solutions are already obtained, and therefore it is not convenient to make use of the oxidation under much higher pressures. For these reasons, in practice, the oxidation can be profitably carried out under a pressure of 1 to 15 atm., and of 1 to 25 atm., if the reaction takes place in the presence of diluents introduced deliberately or forcibly with the reactants used.

The contact time of the reacting gases, that is the residence time of the gas in the catalysis chamber, can vary over a wide range, that is from 0.01 to 10 seconds. The selected value is obviously a function of all the other oxidation parameters and of the type of olefine used. However, in order to obtain high productivity it is in general convenient to reduce this time to a few seconds, or better to a fraction of a second.

Another important factor, connected with the ratio between the olefine concentration and the oxygen concentration, is the oxygen concentration in the gases entering the catalysis chamber. Said concentration according to prior art varies from 1 to 12%. In contrast, according to the present invention, concentrations of 30–35% can be reached, because the diluent can be eliminated. It is advisable to operate with a concentration of 10 to 20%, since under these conditions the highest productivity compatible with high yields and moderate pressures can be obtained. It is however evident that the reaction can be carried out also with lower concentrations. The most suitable value is obviously a function of the other parameters, and of the type of olefine used.

The composition of the carbonylic products obtained can vary over rather wide limits. In dependence upon the selected oxidation conditions, a composition in which the acrolein content represents about 90% of the carbonylic product present can be obtained. Under other experimental conditions, as can be seen from Example 4, the catalysis leads mainly to the formation of other carbonylic compounds, such as formaldehyde, acetaldehyde, propionaldehyde, acetone.

Obviously the oxidation in the apparatus described by us in the accompanying drawings can be carried out in the presence of diluents which are either already present in and introduced with the olefine and/or with the oxygen, or diluents deliberately added. In this case the introduction of an inert substance not only does not cause a substantial improvement in the yields but the other factors being the same, namely pressure, time of contact, ratio of olefine partial pressure to oxygen partial pressure, reaction temperature, it, on the contrary, causes a decrease of productivity proportional to the amount of present inert substance and to the lower oxygen concentration.

The process according to the present invention can obviously be employed for all the olefines having a number of carbon atoms from three to six, which yields carbonylic products by oxidation.

The figures of the drawings have the following significance:

FIG. 1 presents a series of graphs of the percentage of acrolein in the gas phase against the percentage of acrolein in the liquid phase, for 1, 4 and 7 atmospheres pressure;

FIG. 2 is a self-explanatory flow-diagram of the apparatus;

FIG. 3 is a detailed view of the multi-tubular reactor.

The following examples illustrate the present invention without limiting its scope.

Example 1

Into a copper coil, having an inside diameter of about 3 mm., immersed in boiling Dowtherm, 43 mols propylene and 9 mols oxygen are introduced at 370° C. under a pressure of 5 atm., with a contact time in the catalysis tube of 1.4 seconds. 1.29 mols CO and $CO_2$ and 1.12 mols carbonylic products, consisting of 0.84 mol acrolein, the rest consisting of saturated aldehydes, are obtained.

The yield of distilled total aldehydes, referred to the consumed propylene (calculated from its transformation products) is about 70%. The productivity of total aldehydes is 227 g./h./liter of reactor.

The productivity of acrolein is 187 g./h./liter.

Example 2

In the reactor used in the preceding example, 79 mols propylene and 16 mols oxygen are introduced at 390° C. under a pressure of 5 atm., with a contact time of 0.8 second.

In addition to 2.5 mols CO plus $CO_2$, 2.36 mols distilled acrolein and 1.16 mols of other saturated compounds, that is formaldehyde, acetaldehyde, and propionaldehyde, are obtained, by distilling the aqueous solution containing about 8% acrolein obtained by scrubbing the gases with water.

The molar yields calculated on the transformed propylene converted to total aldehydes and acrolein are 79% and 61% respectively.

The conversion of propylene is about 5%. The productivity of total aldehydes is 640 g./h./liter of reactor and that of acrolein is 480 g./h./liter.

Example 3

Into the reactor described in the preceding examples 78 mols propylene and 16 mols oxygen are introduced at 390° C. and under 5 atm. with a contact time of 0.54 second.

1.86 mols acrolein are obtained by distilling the aqueous solution containing about 6% acrolein, obtained by scrubbing the gases.

The acrolein yield, calculated on the basis of the consumed propylene, is 64.4%. The productivity of acrolein is 590 g./h./liter. The productivity of total aldehyde is 760 g./h./liter. The molar yield of total aldehydes, referred to the transformed propylene, is about 80%.

Example 4

Into the reactor described above a mixture consisting of 80% propylene and 20% oxygen (by volume) is introduced at 400° C. under 5 atm. with a contact time of 1.4 seconds.

From 46 mols propylene, by distilling the aqueous solution coming from scrubbing of the gases, 1.18 mols acrolein, 0.9 mol formaldehyde, 0.42 mol acetaldehyde, 0.47 mol propionaldehyde and 0.5 mol of other carbonylic products are obtained.

The molar yield of aldehyde, referred to the consumed propylene, is about 66%.

The productivity of total aldehydes, is 550 g./h./liter.

Example 5

Into the reactor used in the preceding examples 36.9 mols isobutene and 6.9 mols oxygen are introduced at 390° C. under a pressure of 3 atm. with a contact time of 0.8 sec. By distilling the aqueous solution coming from scrubbing of the gases, 0.72 mol methacrolein, 0.2 mol acetone, 0.2 mol formaldehyde, and traces of other saturated aldehydes are obtained. During the oxidation 0.3 mol of CO plus $CO_2$ are also formed.

The yield of methacrolein, calculated on basis of the consumed propylene is 58.5%; the yield of total carbonylic products is 78%. The productivity of the reactor, that is, the total carbonylic compounds and methacrolein, is 380 and 260 g./h./liter respectively.

Example 6

To the reactor described above, 53.6 mols isobutene and 9.2 mols oxygen are fed at 380° C. under a total pressure of 3 atm. with a contact time of 1.2 seconds. During the reaction 0.42 mol of CO plus $CO_2$ are formed and 1.14 mols methacrolein and 0.3 mol acetone, together with 0.4 mol of other saturated aldehydes (mainly formaldehyde) are isolated by distilling the aqueous solution derived from the scrubbing with water.

The yield of methacrolein is 58.5% and that of total carbonylic products is 78.5%. The productivities of methacrolein and total carbonylic products are 175 and 246 g./h./liter respectively.

The process in its preferred form is further characterized as a continuous process for preparing unsaturated carbonylic compounds from olefines containing from three to six carbon atoms, more particularly for preparing acrolein from propylene and methacrolein from isobutene, by oxidizing the olefine at high temperatures and under a superatmospheric pressure, characterized in that the oxidation is carried out in the gaseous phase by passing a mixture, preferably consisting exclusively of an olefine and oxygen, through copper tubes of small diameter from 1 to 12 mm. immersed in a thermostatic fluid, the inner surface of said tubes catalyzing the reaction. It is also characterized in that the oxidation is carried out under a pressure comprised between 1 and 40 atm., preferably between 1 and 25 atm., with the ratio of the olefine partial pressure to the oxygen partial pressure varying from 2 to 15 and the oxygen concentration in the gases fed to the oxidation varying from 1 to 30%, and the contact time of the reacting mixture in the catalysis chamber varying from 0.01 to 10 seconds.

The process of the above examples can be carried out in the apparatus illustrated in the flow diagram of FIG. 2. Oxygen is introduced at 8, and propylene or other olefine gas, at 9. Pump 7 introduces the oxygen and olefine, in admixture with gas recirculated from $CO_2$ scrubber 6, into the reaction vessel 2 containing the copper reaction tubes. The reaction gases are cooled in 3, condensate being caught in trap or tank 4 and passed to the discharge pipe 11. The gases leaving trap 4 are introduced into the tower 5 for scrubbing with water introduced at 10, for further removal of acrolein, or methacrolein. The remaining gases are scrubbed in tower 6, with any commonly employed $CO_2$ removing liquid, and then recirculated to the process.

FIG. 3 illustrates a type of reactor that may be used at 2 in FIG. 2. The gas mixture to be reacted enters at 100 and after passing through copper tubes 50, exits at 20. The thermostatic fluid enters the shell 60 at 30 and exits at 40.

We claim:

1. A process for preparing an unsaturated aldehyde, comprising treating an olefine having from three to six carbon atoms, in gas phase, with molecular oxygen, the oxygen concentration being between 10% and 20% by volume, by passage at superatmospheric pressure ranging up to 40 atmospheres, at 250 to 550° C., through a narrow reaction space elongated in the direction of passage, the wall of which space is elemental metallic copper, and removing heat of reaction by passing heat absorbing liquid in contact with the outer surface of the metal wall, the inner copper surface of the wall furnishing the catalyst for the reaction, said liquid boiling under heat of said reaction, said reaction space being otherwise free of solid catalyst and catalyst carrier bodies, the boiling liquid extracting heat of reaction from said reaction space through said wall, the heat of reaction being transmitted directly from the inner wall through the copper to the boiling liquid.

2. A process of preparing a product of the group consisting of acrolein and methacrolein by oxidizing a compound of the group consisting of propylene and isobutene, comprising treating a mixture of said compound with molecular oxygen at superatmospheric pressure up to 25 atmospheres, at 250 to 550° C., by passage through a narrow reaction space elongated in the direction of passage, the wall of which space is elemental metallic copper, and removing heat of reaction by passing heat absorbing liquid in contact with the outer surface of the metal wall, the inner copper surface of the wall furnishing the catalyst for the reaction, said reaction space being otherwise free of solid catalyst and catalyst carrier bodies, said liquid boiling under heat of said reaction, the boiling liquid extracting heat of reaction from the reaction space through said copper wall, the heat of the reaction being transmitted directly from the inner wall through the copper to the boiling liquid, the ratio of the olefine partial pressure to the oxygen partial pressure varying from 2 to 15, and the oxygen concentration in the gases fed to the oxidation varying from 10 to 20% by volume.

3. A process of preparing a product of the group consisting of acrolein and methacrolein by oxidizing a compound of the group consisting of propylene and isobutene, comprising treating a mixture of said compound with molecular oxygen at superatmospheric pressure up to 25 atmospheres, at 250 to 550° C., by passage through a narrow reaction space elongated in the direction of passage, the wall of which space is elemental metallic copper, and removing heat of reaction by passing heat absorbing liquid in contact with the outer surface of the metal wall, the inner copper surface of the wall furnishing the catalyst for the reaction, said reaction space being otherwise free of solid catalyst and catalyst carrier bodies, said liquid boiling under heat of said reaction, the boiling liquid extracting heat of reaction from the reaction space through said copper wall, the heat of reaction being transmitted directly from the inner wall through the copper to the boiling liquid, the ratio of the olefine partial pressure to the oxygen partial pressure varying from 2 to 15, and the oxygen concentration in the gases fed to the oxidation varying from 10 to 20% by volume, the contact time of the reacting mixture in the catalysis reaction zone ranging from 0.01 to 10 seconds.

4. The process of claim 1, the gas introduced into the reaction space consisting essentially of the olefine and the molecular oxygen.

5. The process of claim 1, the gas introduced into the reaction space containing less than 10% by volume of diluents, the ratio of the olefine partial pressure to the oxygen partial pressure varying from 2 to 15.

6. The process of claim 1, the reaction space having a maximum cross-sectional dimension not greater than twelve millimeters.

7. A process of preparing a product of the group consisting of acrolein and methacrolein by oxidizing a compound of the group consisting of propylene and isobutene, comprising treating a mixture of said compound with molecular oxygen at superatmospheric pressure, at 250 to 550° C., by passage through a narrow reaction space elongated in the direction of passage, the wall of which space is elemental metallic copper, and removing heat of reaction by passing heat absorbing liquid in contact with the outer surface of the metal wall, the inner copper surface of the wall furnishing the catalyst for the reaction, said reaction space being otherwise free of solid catalyst and catalyst carrier bodies, said liquid boiling under heat of said reaction, the boiling liquid extracting heat of reaction from the reaction space through said copper wall, the heat of reaction being transmitted directly from the inner wall through the copper to the boiling liquid, the ratio of the olefine partial pressure to the oxygen partial pressure varying from 2 to 15, and the oxygen concentration in the gases fed to the oxidation varying from 10 to 20% by volume, the contact time of the reacting mixture in the catalysis reaction zone ranging from 0.01 to 10 seconds, the gas introduced into the reaction space containing less than 10% by volume of diluents.

References Cited in the file of this patent

UNITED STATES PATENTS

| | | |
|---|---|---|
| 2,244,210 | Nashan | June 3, 1941 |
| 2,451,485 | Hearne et al. | Oct. 19, 1948 |
| 2,847,475 | Voge et al. | Aug. 12, 1958 |